(12) United States Patent
Bae et al.

(10) Patent No.: US 12,314,357 B2
(45) Date of Patent: May 27, 2025

(54) VERIFIABLE CREDENTIAL VERIFYING APPARATUS AND METHOD

(71) Applicant: DREAMSECURITY CO., LTD., Seoul (KR)

(72) Inventors: Woong-Shik Bae, Seongnam-si (KR); Jeong-Min Woo, Yongin-si (KR)

(73) Assignee: DreamSecurity Co., Ltd., Seoul (KR)

( * ) Notice: Subject to any disclaimer, the term of this patent is extended or adjusted under 35 U.S.C. 154(b) by 239 days.

(21) Appl. No.: 17/997,768

(22) PCT Filed: Nov. 4, 2020

(86) PCT No.: PCT/KR2020/015351
§ 371 (c)(1),
(2) Date: Nov. 2, 2022

(87) PCT Pub. No.: WO2022/097769
PCT Pub. Date: May 12, 2022

(65) Prior Publication Data
US 2023/0350988 A1  Nov. 2, 2023

(30) Foreign Application Priority Data
Nov. 3, 2020 (KR) .................. 10-2020-0145386

(51) Int. Cl.
*G06F 21/31* (2013.01)
(52) U.S. Cl.
CPC .................................. *G06F 21/31* (2013.01)
(58) Field of Classification Search
CPC ..................................................... G06F 21/31
See application file for complete search history.

(56) References Cited

U.S. PATENT DOCUMENTS

| 9,338,164 B1* | 5/2016 | Liu ..................... H04L 63/0869 |
| 2011/0219230 A1* | 9/2011 | Oberheide ................ H04L 9/32 |
| | | 713/168 |

(Continued)

FOREIGN PATENT DOCUMENTS

| CN | 111431936 A | 7/2020 |
| JP | 2012-208856 A | 10/2012 |

(Continued)

OTHER PUBLICATIONS

NPL Search History (Year: 2024).*

(Continued)

*Primary Examiner* — Samson B Lemma
*Assistant Examiner* — Richard W Cruz-Franqui
(74) *Attorney, Agent, or Firm* — TraskBritt (57) ABSTRACT

A verifiable credential verifying apparatus and method are disclosed. The verifiable credential verifying method of the verifiable credential verifying apparatus, according to an embodiment of the present disclosure, comprises the steps of receiving, by the verifiable credential verifying apparatus, a verifiable credential verification request for receiving approval of using a service provided by a service provider from a first terminal of a service user, verifying verifiable credential of the first terminal by using first verifiable credential of the first terminal, which has been received according to the verifiable credential verification request, and second verifiable credential pre-registered by the first terminal in the verifiable credential verifying apparatus; and transmitting a result of verifying the verifiable credential of the first terminal to the first terminal and a second terminal of the service provider.

4 Claims, 4 Drawing Sheets

(56) References Cited

U.S. PATENT DOCUMENTS

| | | | |
|---|---|---|---|
| 2013/0167208 A1* | 6/2013 | Shi .......................... | H04L 63/18 |
| | | | 726/5 |
| 2014/0026204 A1* | 1/2014 | Buntinx .................. | H04L 63/10 |
| | | | 726/9 |
| 2019/0319939 A1* | 10/2019 | Hamel .................... | G06F 21/33 |
| 2020/0036707 A1* | 1/2020 | Callahan ................. | H04L 67/53 |
| 2021/0150011 A1* | 5/2021 | Gu .......................... | G06Q 50/18 |
| 2021/0273931 A1* | 9/2021 | Murdoch .............. | H04L 9/3239 |
| 2021/0314309 A1* | 10/2021 | Lee ....................... | H04W 12/06 |
| 2021/0385216 A1* | 12/2021 | Khalil ....................... | H04L 9/50 |
| 2022/0318757 A1* | 10/2022 | Zaidi .................. | G06Q 10/1053 |

FOREIGN PATENT DOCUMENTS

| | | |
|---|---|---|
| KR | 10-2047260 B1 | 11/2019 |
| KR | 10-2020-0034289 A | 3/2020 |
| KR | 10-2139645 B1 | 7/2020 |
| KR | 10-2160915 B1 | 10/2020 |

OTHER PUBLICATIONS

International Search Report for International Application No. PCT/KR2020/015351, mailed Nov. 15, 2021, 6 pages with English Translation.

International Written Opinion for International Application No. PCT/KR2020/015351, mailed Nov. 15, 2021, 7 pages with English Machine Translation.

Sporney et al. "Decentralized Identifiers(DIDs) v1.0," W3C Recommendation, Jul. 19, 2022, 114 pages.

Sporny et al. "Verifiable Credentials DataModel v1.1," W3C Recommendation, Mar. 3, 2022, 129 Pages.

* cited by examiner

VERIFIABLE CREDENTIAL VERIFYING APPARATUS AND METHOD

CROSS-REFERENCE TO RELATED APPLICATIONS

This application is a national phase entry under 35 U.S.C. § 371 of International Patent Application PCT/KR2020/015351, filed Nov. 4, 2020, designating the United States of America and published as International Patent Publication WO 2022/097769 A1 on May 12, 2022, which claims the benefit under Article 8 of the Patent Cooperation Treaty to Korean Patent Application Serial No. 10-2020-0145386, filed Nov. 3, 2020.

TECHNICAL FIELD

This disclosure relates generally to identity information verification technology and, more particularly, to technology for enabling a service provider to verify identity information of a service user in an offline environment.

BACKGROUND

With the development of IT technology, individuals have come to use various types of digital identity credentials (Verifiable Credentials (VC)) based on the W3C Decentralized Identifier (DID) standards. Mobile credit cards and membership cards are representative examples thereof, and several to tens of sets of digital identity credentials are possessed and used by each user.

These days, because most digital identity credentials are managed and used using smartphones, it is difficult to provide a user with complete service without a smartphone in an offline environment.

Particularly, when service provider verifies the identity information of a service user in an offline, many service users may be hesitant to directly provide their digital identity credentials to untrusted service providers.

Also, medium- and small-sized service providers in an offline environment may not have devices capable of receiving digital identity credentials from service users or verifying the identity of service users by checking the integrity and validity of received digital identity credentials.

Accordingly, the present disclosure proposes technology in which a service provider indirectly receives identity information of a service user through an identity information verification apparatus and checks a verification result using terminals of the service user and the service provider in an offline environment without additional terminal devices.

Meanwhile, Korean Patent No. 10-2160915, titled "Apparatus and method for providing product purchase service through identification without media," discloses an apparatus and method for providing a product purchase service through identification without media, the apparatus and method being configured such that user authentication is performed in response to a request to verify the identity of a user and a request to order a product received from a service provision terminal and payment for the order are processed based on the user authentication result and VC information.

BRIEF SUMMARY

The present disclosure may enable identity information of a service user to be verified without the service user exposing the identity information to a service provider.

Also, the present disclosure intends to enable small service providers, such as medium- and small-sized bricks-and-mortar stores, to verify identity information of a service user without an additional device.

In order to accomplish the above objects, a method for verifying identity information, which is performed by an identity information verification apparatus, according to an embodiment of the present disclosure includes receiving, by the identity information verification apparatus, a request for identity information verification, which is required for receiving approval to use a service provided by a service provider, from a first terminal of a service user, verifying identity information of the first terminal using first identity information of the first terminal, which is received according to the request for identity information verification, and second identity information registered in advance in the identity information verification apparatus by the first terminal, and transmitting a result of verification of the identity information of the first terminal to the first terminal and a second terminal of the service provider.

Here, receiving the request for identity information verification may comprise scanning, by the first terminal, a QR image provided by the service provider and thereby selecting the first identity information issued in advance by an external issuing organization.

Here, verifying the identity information may comprise verifying the identity information of the first terminal using identifier information of the service user, identifier information of the issuing organization that issued the first identity information, and information about a validity state of the first identity information, which are posted in advance in a blockchain.

Here, verifying the identity information may comprise verifying the first identity information by performing a comparison to check whether an owner of the first identity information is identical to an entity that registered the second identity information, by verifying a digital signature of the issuing organization, with which the first identity information is signed, by checking whether a submitter of the first identity information is identical to the owner of the first identity information, and by checking the information about the validity state of the first identity information in the blockchain.

Here, the QR image may contain identity requirement information of the service provider and a link for requesting identity information verification.

Here, receiving the request for identity information verification may comprise processing authentication of the first terminal, which makes access through the link for requesting identity information verification, using the second identity information and receiving the identity requirement information of the service provider and the first identity information.

Here, verifying the identity information may comprise generating the result of verification of the identity information when the first identity information satisfies the identity requirement information of the service provider.

Here, transmitting the result of verification of the identity information may comprise permitting, by the second terminal, the service user corresponding to the first terminal to use the service based on a result of comparison of the identity information verification result received by the second terminal with the identity information verification result received by the first terminal.

Also, in order to accomplish the above objects, an apparatus for verifying identity information according to an embodiment of the present disclosure includes one or more processors and executable memory for storing at least one program executed by the one or more processors, and the at least one program receives a request for identity information verification, which is required for receiving approval to use a service provided by a service provider, from a first terminal of a service user, verifies identity information of the first terminal using first identity information of the first terminal, which is received according to the request for identity information verification, and second identity information registered in advance by the first terminal, and transmits a result of verification of the identity information of the first terminal to the first terminal and a second terminal of the service provider.

Here, the first terminal may scan a QR image provided by the service provider, thereby selecting the first identity information issued in advance by an external issuing organization.

Here, the at least one program may verify the identity information of the first terminal using identifier information of the service user, identifier information of the issuing organization that issued the first identity information, and information about a validity state of the first identity information, which are posted in advance in a blockchain.

Here, the at least one program may verify the first identity information by performing a comparison to check whether an issuer of the first identity information is identical to an entity that registered the second identity information, by verifying a digital signature of the issuing organization, with which the first identity information is signed, by checking whether a submitter of the first identity information is identical to an owner of the first identity information, and by checking the information about the validity state of the first identity information in the blockchain.

Here, the QR image may contain identity requirement information of the service provider and a link for requesting identity information verification.

Here, the at least one program may process authentication of the first terminal, which makes access thereto through the link for requesting identity information verification, using the second identity information and receive the identity requirement information of the service provider and the first identity information.

Here, the at least one program may generate the result of verification of the identity information when the first identity information satisfies the identity requirement information of the service provider.

Here, the second terminal may permit the service user corresponding to the first terminal to use the service based on a result of comparison of the identity information verification result received thereby with the identity information verification result received by the first terminal.

The present disclosure may enable the identity information of a service user to be verified without the service user exposing the identity information to a service provider.

Also, the present disclosure may enable small service providers, such as medium- and small-sized bricks-and-mortar stores, to verify the identity information of a service user without an additional device.

DETAILED DESCRIPTION

The present disclosure will be described in detail below with reference to the accompanying drawings. Repeated descriptions and descriptions of known functions and configurations that have been deemed to unnecessarily obscure the gist of the present disclosure will be omitted below. The embodiments of this disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

Figure 1:
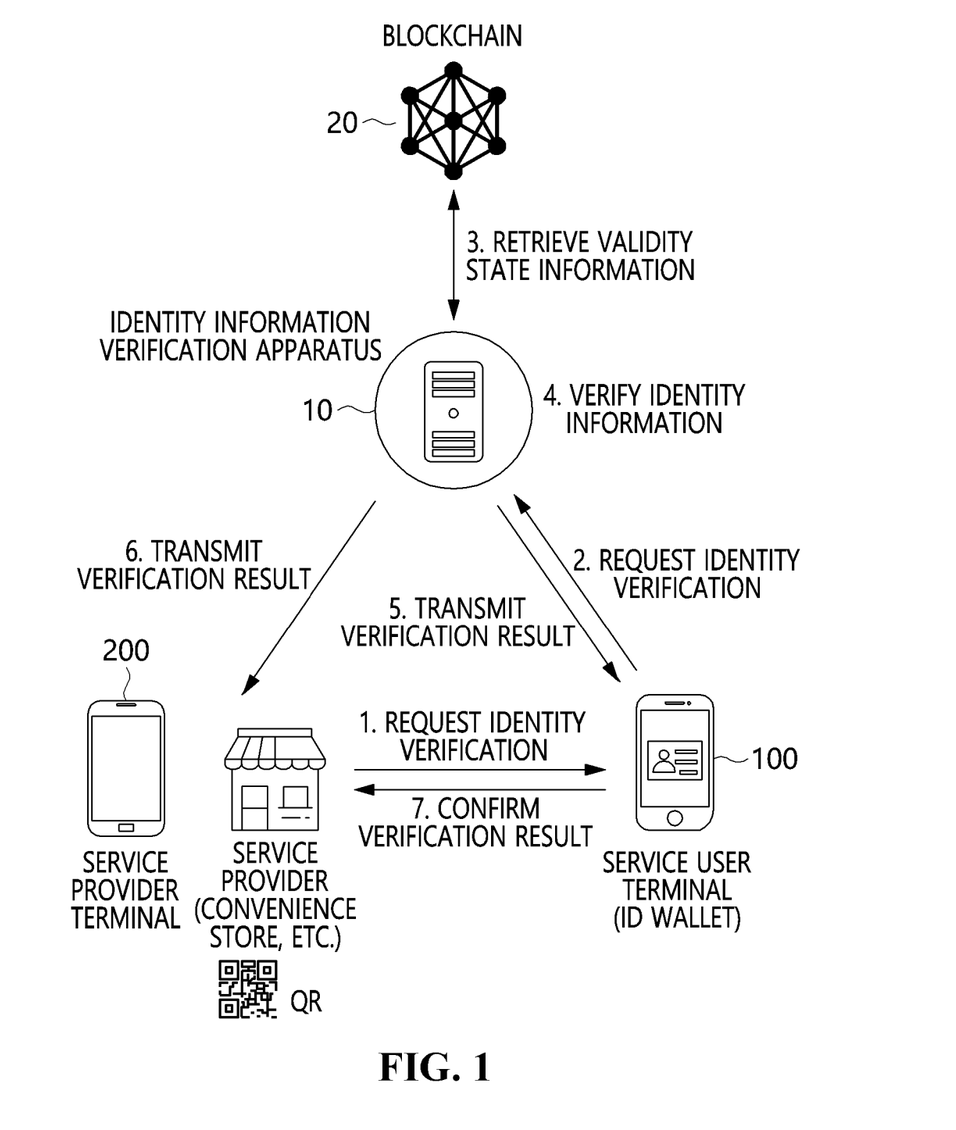
FIG. 1 is a view illustrating a system for verifying identity information according to an embodiment of the present disclosure.

FIG. 1 is a view illustrating a system for verifying identity information according to an embodiment of the present disclosure.

Referring to FIG. 1, the system for verifying identity information according to an embodiment of the present disclosure includes an identity information verification apparatus 10, a blockchain 20, a first terminal 100 of a service user, and a second terminal 200 of a service provider.

First, in order to receive approval to use the service provided by the service provider, the service user may make a request to use a service.

The service provided by the service provider may include various examples of services that are restricted such that the services are provided only to specific users, for example, a service that requires age verification for the sale of alcohol, cigarettes, drugs, or the like in convenience stores.

Here, in response to a request to use such a service from a service user, the service provider may request identity information verification from the service user by requesting the service user to scan a QR image, which is generated in advance and provided (1).

The QR image may contain identity requirement information of the service provider and a link through which the identity information verification apparatus can be accessed in order to verify identity information.

For example, the identity requirement information may include information specifying that a service is to be provided only when a service user is an adult.

Also, the QR image may further contain a personal ID for the service provider, a business place ID, a receiver ID of the second terminal 200 of the service provider, and the like.

Here, when the service user scans the QR image through an application, a digital identity credential (Verifiable Credential (VC)), which is identity information or contains identity information (a resident registration card, a driving license, a student's identification card, a digital signature, a trusted certificate, or the like) that the service user has received in advance from an external issuing organization, is selected by service user, or previously registered identity information is automatically selected, and then the request for identity information verification may be transmitted to the identity information verification apparatus 10 along with the information contained in the QR image (2).

Here, the first terminal 100 of the service user may generate a Verifiable Presentation (VP), which is a format for submission of a verifiable credential (VC), and submit the VP to the identity information verification apparatus 10.

In response to the request for identity information verification from service user, made by scanning the QR image, the identity information verification apparatus 10 may retrieve the identifier information of the VC issuing organization, the identifier information of the submitter of the VP (service user), and information about the validity state of first identity information from the blockchain 20 (3).

Here, the identifier information may be a Decentralized ID (DID) document in any of various forms posted in advance in the blockchain 20.

The identity information verification apparatus 10 checks the integrity of the first identity information of the service user by verifying the digital signature of the issuing organization, with which the first identity information is signed, using the DID document of the VC issuing organization, checks whether the identity information is being illegally used by verifying the digital signature of the submitter of the VP (service user), with which the first identity information is signed, using the DID document of the submitter of the VP and checking whether the DID of the owner of the first identity information is the same as the DID of the submitter, and checks the information about the validity state of the first identity information (the validity period and whether the information is discarded), which is retrieved from the blockchain 20, thereby verifying the identity information (4).

Here, when the identity information verification succeeds, the identity information verification apparatus 10 may generate an identity information verification result and transmit the same to the first terminal 100 of the service user and the second terminal 200 of the service provider (5, 6).

The identity information verification result may be generated as data having various forms.

For example, the identity information verification result may be a confirmation number configured with a combination of digits, a code configured with a combination of digits and letters, a random image, a voice message, a video message, or data encrypted based on a public key and a private key.

The service user and the service provider output and compare the identity information verification result received by the first terminal 100 of the service user and that received by the second terminal 200 of the service provider, and when it is confirmed that the same verification result is output, the service provider may permit the service user to use the service (7).

For example, when the identity information verification succeeds, the identity information verification apparatus 10 may generate a confirmation number using a random combination of 4 to 6 digits so as to be easily recognizable by humans and transmit the same to the first terminal 100 of the service user and the second terminal 200 of the service provider in the form of a push notification appearing in an app, SMS, or the like.

Here, the service provider may request a confirmation number from the service user after checking the confirmation number "1234" received in the second terminal 200 of the service provider, and the service user may show the confirmation number "1234" output in the first terminal 100 of the service user and receive confirmation that the same confirmation number is output, thereby receiving confirmation that the identity information is verified and receiving approval to use the service from the service provider.

Figure 2:
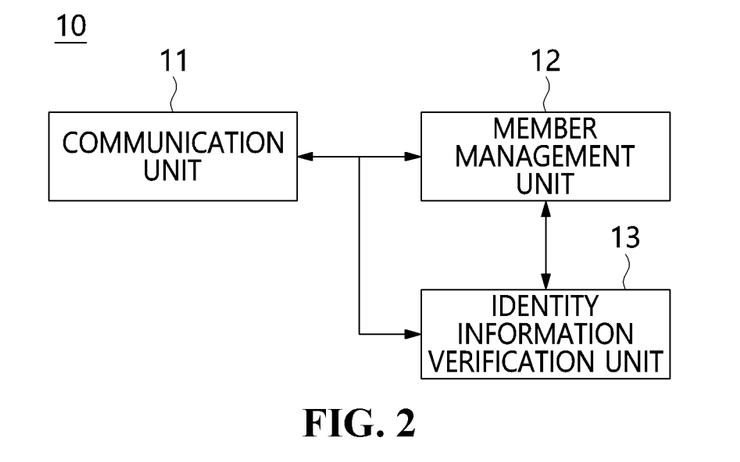
FIG. 2 is a block diagram illustrating an apparatus for verifying identity information according to an embodiment of the present disclosure.

FIG. 2 is a block diagram illustrating an identity information verification apparatus 10 according to an embodiment of the present disclosure.

Referring to FIG. 2, the identity information verification apparatus 10 according to an embodiment of the present disclosure may include a communication unit 11, a member management unit 12, and an identity information verification unit 13.

The communication unit 11 may receive member information from a terminal, receive a request to verify identity information, and transmit the result of verification of the identity information to the terminal in order to provide an identity information verification service.

The member management unit 12 may enable a service provider and a service user to sign up for the identity information verification service and manage information about the service provider and the service user in order to provide the identity information verification service.

Here, the member management unit 12 approves of the service provider joining the service, and may receive registration of a service provider name (business name), POS information of the service provider (simple serial numbers POS1, POS2, . . . ), information about terminals of staff members employed by the service provider (mobile phone numbers), the public key and identifier information (DID) of the second terminal 200 of the service provider, and the like.

Here, the member management unit 12 may generate a QR image (QR code), which is issued for each service provider, and provide the same to the service provider.

Here, the service provider may save the QR code as an image, and may display the QR image on a separate display device or display a printout of the QR image in the business place.

The QR image may contain identity requirement information of the service provider and a link (URL information for submitting a VP) through which the identity information verification apparatus can be accessed in order to verify identity information.

For example, the identity requirement information may include information specifying that a service is to be provided only when a service user is an adult.

Here, the QR image may further contain a personal ID for the service provider, a business place ID, a receiver ID of the second terminal 200 of the service provider, and the like.

Also, the member management unit 12 may approve of the service user joining the service, receive registration of the personal information of the service user and the public key and identifier information (DID) of the first terminal 100 of the service user, which are required for logging into the service and authentication, and manage the information as second identity information for identity information verification.

The identity information verification unit 13 may receive a request for identity information verification from the first terminal 100 of the service user, which is required in order to receive approval to use the service provided by the service provider.

Here, the first terminal 100 of the service user may select first identity information VC, which is issued in advance by an external issuing organization, by scanning the QR image displayed in the business place by the service provider, and may transmit a request for identity information verification along with the information contained in the QR image.

Here, the identity information verification unit 13 may process authentication of the first terminal, which accesses the same through the link for requesting identity information verification, using the previously registered second identity information, and may receive the identity requirement information of the service provider and the first identity information.

Here, the first terminal 100 of the service user may generate a VP from the VC, which is the first identity information issued in advance by an external issuing organization, and submit the same along with the request for identity information verification.

Here, the identity information verification unit 13 may receive the VP generated from the VC, which is the first identity information that the first terminal 100 of the service user has received in advance from an external issuing organization.

Here, the identity information verification unit 13 may retrieve a DID document and information about the state of the VC from the blockchain 20 using the service user information and the VC-issuing organization information extracted from the received VP.

Also, the identity information verification unit 13 may verify the identity information of the first terminal using the first identity information of the first terminal 100 of the service user, which is received according to the request for identity information verification, and the second identity information, which is registered in advance in the identity information verification apparatus by the first terminal 100 of the service user.

Here, the identity information verification unit 13 may verify the identity information of the first terminal 100 of the service user using the identifier information of the service user, the identifier information of the issuing organization that issued the first identity information, and information about the validity state of the first identity information, which are posted in advance in the blockchain 20.

Here, the identity information verification unit 13 performs a comparison to check whether the owner of the first identity information is identical to the entity that registered the second identity information, verifies the digital signature of the issuing organization, with which the first identity information is signed, checks whether the submitter of the first identity information is identical to the owner of the first identity information, and checks the information about the validity state of the first identity information in the blockchain 20, thereby verifying the first identity information.

Here, the identity information verification unit 13 checks the integrity of the first identity information of the service user by verifying the digital signature of the issuing organization, with which the first identity information is signed, using the DID document of the VC issuing organization, checks whether the identity information is being illegally used by verifying the digital signature of the submitter of the VP (service user), with which the first identity information is signed, using the DID document of the submitter of the VP and checking whether the DID of the owner of the first identity information is the same as the DID of the submitter, and checks the information about the validity state of the first identity information (the validity period and whether the information is discarded), which is retrieved from the blockchain 20, thereby verifying the identity information of the first terminal 100 of the service user.

Here, the identity information verification unit 13 may generate an identity information verification result when the first identity information satisfies the identity requirement information of the service provider.

For example, when the identity requirement information of the service provider specifies adult verification and when the service user corresponding to the first identity information is an adult, the identity information verification unit 13 may generate an identity information verification result.

Also, the identity information verification unit 13 may transmit the result of verification of the identity information of the first terminal 100 of the service user to the first terminal 100 of the service user and the second terminal 200 of the service provider.

Here, the identity information verification unit 13 may transmit the identity information verification result to the service user.

For example, the identity information verification unit 13 may transmit the identity information verification result to the first terminal 100 of the service user in SMS form. This may be applied regardless of the ID wallet type of the service user.

Here, when an ID wallet app is supported, the identity information verification unit 13 may return a verification result confirmation number in response to the VP submitted by the app.

Here, the identity information verification unit 13 may maintain communication connection with the first terminal 100 of the service user until the app receives a confirmation number subsequent to submitting the VP.

Here, when an ID wallet app is supported, the identity information verification unit 13 may transmit the identity information verification result in the form of an app push notification.

Here, at the step of transmitting the identity information verification result, the second terminal 200 of the service provider may permit the service user corresponding to the first terminal 100 of the service user to use the service based on the result of comparison of the identity information verification result received by the second terminal 200 of the service provider with the identity information verification result received by the first terminal 100 of the service user.

The identity information verification result may be generated as data having various forms.

For example, the identity information verification result may be a confirmation number configured with a combination of digits, a code configured with a combination of digits and letters, a random image, a voice message, a video message, or data encrypted based on a public key and a private key.

The service user and the service provider output and compare the identity information verification result received by the first terminal 100 of the service user and that received by the second terminal 200 of the service provider, and when it is confirmed that the same information is output, the service provider may permit the service user to use the service.

Here, when the identity information verification succeeds, the identity information verification unit 13 may generate a confirmation number using a random combination of 4 to 6 digits so as to be easily recognizable by humans and transmit the same to the first terminal 100 of the service user and the second terminal 200 of the service provider in the form of a push notification appearing in an app, SMS, or the like.

Here, the service provider may request a confirmation number from the service user after checking the confirmation number "1234" received in the second terminal 200 of the service provider, and the service user may show the confirmation number "1234" output in the terminal of the service user and receive confirmation that the same confirmation number is output, thereby receiving confirmation that the identity information is verified and receiving approval to use the service from the service provider.

Here, upon receiving the identity information verification result, the first terminal 100 of the service user and the second terminal 200 of the service provider transmit and receive the identity information verification result therebetween through nearfield communication, and when the identity information verification results are the same as each other, it may be automatically confirmed that the identity verification result is "success."

Also, the identity information verification unit 13 may transmit a verification result encrypted using the public keys, which are received in advance from the service provider and the service user at registration time, to the first terminal 100 of the service user and the second terminal 200 of the service provider as the identity verification result.

Here, when the identity information verification unit 13 transmits the verification result encrypted with the public key of the service user to the first terminal 100 of the service user, the first terminal 100 of the service user decrypts the encrypted verification result using the private key of the service user, and when the identity information verification unit 13 transmits the verification result encrypted with the public key of the service provider to the second terminal 200 of the service provider, the second terminal 200 of the service provider decrypts the encrypted verification result using the private key of the service provider, whereby the first terminal 100 of the service user and the second terminal 200 of the service provider may acquire the decrypted verification result.

Here, the service user and the service provider may check the verification result by displaying the decrypted verification result in the first terminal 100 of the service user and the second terminal 200 of the service provider, as described above, or the first terminal 100 of the service user and the second terminal 200 of the service provider may automatically check and output the verification result through nearfield communication therebetween.

Figure 3:
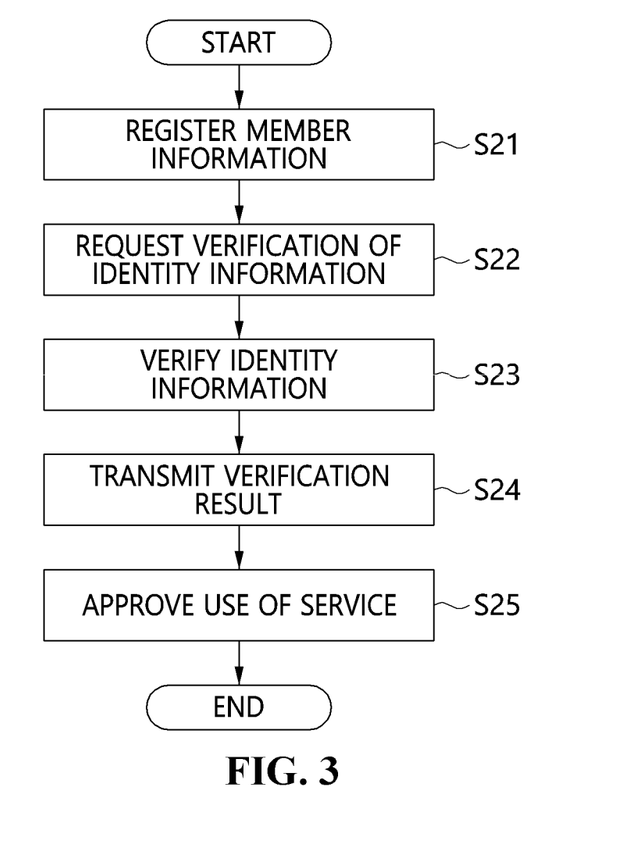
FIG. 3 is a flowchart illustrating a method for verifying identity information according to an embodiment of the present disclosure.

FIG. 3 is a flowchart illustrating a method for verifying identity information according to an embodiment of the present disclosure.

Referring to FIG. 3, in the method for verifying identity information according to an embodiment of the present disclosure, first, member information may be registered at step S21.

That is, at step S21, a procedure for signing up for an identity information verification service may be provided to a service provider and a service user in order to provide the identity information verification service, and information of the service provider and the service user may be registered and managed.

Here, at step S21, a request by the service provider to join the service is approved, and a service provider name (business name), POS information of the service provider (simple serial numbers POS1, POS2, . . . ), information about terminals of staff members employed by the service provider (mobile phone numbers), the public key and identifier information (DID) of the second terminal 200 of the service provider, and the like may be registered.

Here, at step S21, a QR image (QR code), which is issued for each service provider, may be generated and provided to the service provider.

Here, the service provider may save the QR code as an image, and may display the QR image on a separate display device or display a printout of the QR image in the business place.

The QR image may contain identity requirement information of the service provider and a link (URL information for submitting a VP) through which an identity information verification apparatus can be accessed in order to verify identity information.

For example, the identity requirement information may include information specifying that a service is to be provided only when a service user is an adult.

Here, the QR image may further contain a personal ID for the service provider, a business place ID, a receiver ID of the second terminal 200 of the service provider, and the like.

Here, at step S21, a request by the service user to join the service is approved, and the personal information of the service user and the public key and identifier information (DID) of the first terminal 100 of the service user, which are required for logging into the service and authentication, may be registered and managed as second identity information for identity information verification.

Also, in the method for verifying identity information according to an embodiment of the present disclosure, a request for identity information verification may be received at step S22.

That is, at step S22, the identity information verification apparatus 10 may receive a request for identity information verification for receiving approval to use the service provided by the service provider from the first terminal 100 of the service user.

Here, at step S22, the first terminal 100 of the service user may select first identity information, which is issued in advance by an external issuing organization, by scanning the QR image provided by the service provider.

Here, the QR image may contain identity requirement information of the service provider and a link for requesting identity information verification.

Here, at step S22, authentication of the first terminal 100 of the service user, which accesses the identity information verification apparatus 10 through the link for requesting identity information verification, is processed using the second identity information of the service user, which is registered in advance in the identity information verification apparatus 10 by the first terminal 100 of the service user, and the identity requirement information of the service provider and the first identity information may be received.

Here, at step S22, the request for identity information verification for receiving approval to use the service provided by the service provider may be received from the first terminal 100 of the service user.

Here, at step S22, the first terminal 100 of the service user may select the first identity information VC, issued in advance by an external issuing organization, by scanning the QR image displayed in the business place by the service provider, and may transmit the request for identity information verification along with the information contained in the QR image.

Here, at step S22, authentication of the first terminal 100 of the service user, which makes access through the link for requesting identity information verification, is processed using the second identity information registered in advance, and the identity requirement information of the service provider and the first identity information may be received.

Here, at step S22, the first terminal 100 of the service user may generate a VP from the VC, which is the first identity information issued in advance by an external issuing organization, and submit the same along with the request for identity information verification.

Here, at step S22, the VP generated from the VC, which is the first identity information that the first terminal 100 of the service user has received in advance from an external issuing organization, may be received.

Here, at step S22, a DID document and information about the state of the VC posted in the blockchain 20 may be retrieved using the service user information and the VC-issuing organization information extracted from the received VP.

Also, in the method for verifying identity information according to an embodiment of this disclosure, the identity information may be verified at step S23.

That is, at step S23, the identity information of the first terminal 100 of the service user may be verified using the first identity information of the first terminal 100 of the service user, which is received according to the request for identity information verification, and the second identity information of the service user, which is registered in advance in the identity information verification apparatus 10 by the first terminal 100 of the service user.

Here, at step S23, the identity information of the first terminal 100 of the service user may be verified using the identifier information of the service user, the identifier information of the issuing organization that issued the first identity information, and information about the validity state of the first identity information, which are posted in advance in the blockchain 20.

Here, at step S23, whether the owner of the first identity information is identical to the entity that registered the second identity information is checked through comparison, the digital signature of the issuing organization, with which the first identity information is signed, is verified, whether the submitter of the first identity information is identical to the owner of the first identity information is checked, and the information about the validity state of the first identity information is checked in the blockchain 20, whereby the first identity information may be verified.

Here, at step S23, the integrity of the first identity information of the service user is checked by verifying the digital signature of the issuing organization, with which the first identity information is signed, using the DID document of the VC issuing organization, whether the identity information is being illegally used is checked by verifying the digital signature of the submitter of the VP (service user), with which the first identity information is signed, using the DID document of the submitter of the VP and checking whether the DID of the owner of the first identity information is the same as the DID of the submitter, and the information about the validity state of the first identity information (the validity period and whether the information is discarded), which is retrieved from the blockchain 20, is checked, whereby the identity information of the first terminal 100 of the service user may be verified.

Here, at step S23, an identity information verification result may be generated when the first identity information satisfies the identity requirement information of the service provider.

For example, at step S23, when the identity requirement information of the service provider specifies adult verification and when the service user corresponding to the first identity information is an adult, an identity information verification result may be generated.

The identity information verification result may be generated as data having various forms.

For example, the identity information verification result may be a confirmation number configured with a combination of digits, a code configured with a combination of digits and letters, a random image, a voice message, a video message, or data encrypted based on a public key and a private key.

Here, at step S23, an encrypted verification result may be generated using the public keys, which are received in advance from the service provider and the service user at registration time.

Also, in the method for verifying identity information according to an embodiment of the present disclosure, the identity information verification result may be transmitted at step S24.

That is, at step S24, the result of verification of the identity information of the first terminal 100 of the service user may be transmitted to the first terminal 100 of the service user and the second terminal 200 of the service provider.

Here, at step S24, the identity information verification result may be transmitted to the service user.

For example, at step S24, the identity information verification result may be transmitted to the first terminal 100 of the service user in SMS form. This may be applied regardless of the ID wallet type of the service user.

Here, at step S24, when an ID wallet app is supported, a verification result confirmation number may be returned in response to the VP submitted by the app.

Here, at step S24, communication connection between the first terminal 100 of the service user and the identity information verification apparatus 10 may be maintained until the app receives a confirmation number subsequent to submitting the VP.

Here, at step S24, when an ID wallet app is supported, the identity information verification result may be transmitted in the form of an app push notification.

Also, in the method for verifying identity information according to an embodiment of the present disclosure, use of the service may be approved at step S25.

That is, at step S25, the second terminal 200 of the service provider may permit the service user corresponding to the first terminal 100 of the service user to use the service based on the result of comparison of the identity information verification result received by the second terminal 200 of the service provider with the identity information verification result received by the first terminal 100 of the service user.

Here, at step S25, the service user and the service provider output and compare the identity information verification result received by the first terminal 100 of the service user and that received by the second terminal 200 of the service provider, and when it is confirmed that the same information is output, the service provider may permit the service user to use the service.

Here, at step S25, when identity information verification succeeds, a confirmation number may be generated using a random combination of 4 to 6 digits so as to be easily recognizable by humans and transmitted to the first terminal 100 of the service user and the second terminal 200 of the service provider in the form of a push notification appearing in an app, SMS, or the like.

Here, at step S25, the service provider may request a confirmation number from the service user after checking the confirmation number "1234" received in the second terminal 200 of the service provider, and the service user may show the confirmation number "1234" output in the first terminal 100 of the service user and receive confirmation that the same confirmation number is output, thereby receiving confirmation that the identity information is verified and receiving approval to use the service from the service provider.

Here, at step S25, upon receiving the identity information verification result, the first terminal 100 of the service user and the second terminal 200 of the service provider transmit and receive the identity information verification result therebetween through nearfield communication, and when the identity information verification results are the same as each other, it may be automatically confirmed that the identity verification result is "success."

Here, at step S25, when the verification result encrypted with the public key of the service user is transmitted to the first terminal 100 of the service user, the first terminal 100 of the service user decrypts the encrypted verification result using the private key of the service user, and when the verification result encrypted with the public key of the service provider is transmitted to the second terminal 200 of the service provider, the second terminal 200 of the service provider decrypts the encrypted verification result using the private key of the service provider, whereby the first terminal 100 of the service user and the second terminal 200 of the service provider may acquire the decrypted verification result.

Here, at step S25, the service user and the service provider may check the verification result by displaying the decrypted verification result in the first terminal 100 of the service user and the second terminal 200 of the service provider, as described above, or the first terminal 100 of the service user and the second terminal 200 of the service provider may automatically check and output the verification result through nearfield communication therebetween.

Figure 4:
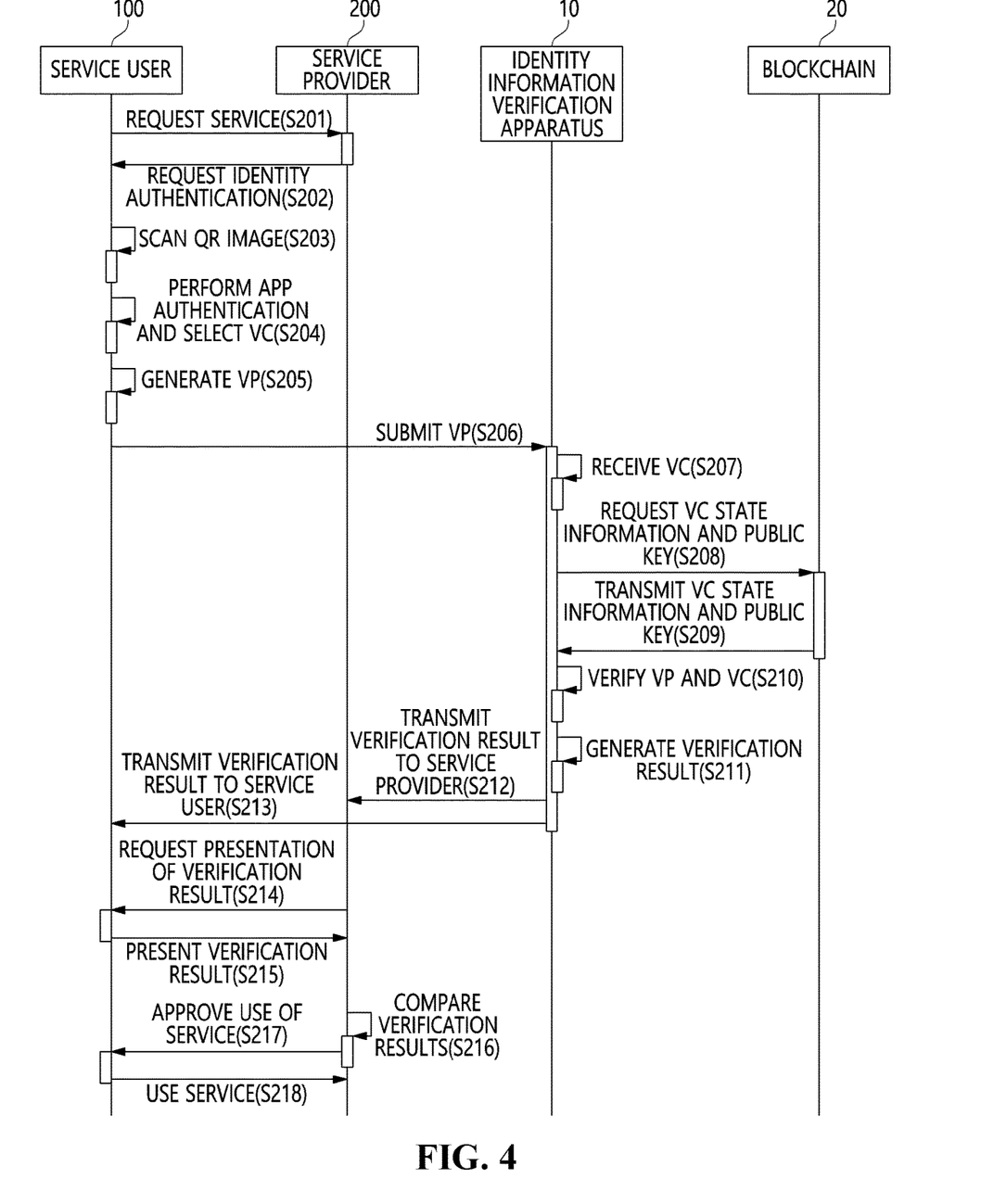
FIG. 4 is a sequence diagram illustrating a method for verifying identity information according to an embodiment of the present disclosure.

FIG. 4 is a sequence diagram illustrating a method for verifying identity information according to an embodiment of the present disclosure.

Referring to FIG. 4, in the method for verifying identity information according to an embodiment of the present disclosure, first, a service user may make a service use request to a service provider at step S201.

For example, at step S201, the service user may request a service that requires age verification, pertaining to, for example, alcohol, cigarettes, drugs, or the like, from the service provider.

The service provider may request identity information verification at step S202 in response to the service use request from the service user.

For example, the service provider may request age verification in order to check the age of the service user.

Here, in response to the service use request from the service user, the service provider may request identity information verification by requesting the service user to scan a QR image, which is generated in advance and displayed.

The QR image may contain identity requirement information of the service provider and a link through which an identity information verification apparatus can be accessed in order to verify identity information.

For example, the identity requirement information may include information specifying that a service is to be provided only when a service user is an adult.

Also, the QR image may further contain a personal ID for the service provider, a business place ID, a receiver ID of the second terminal 200 of the service provider, and the like.

The service user may register for the application provided by the identity information verification apparatus 10 in advance using the first terminal 100 of the service user, and the first terminal 100 of the service user may scan the QR image at step S203 using the application.

The first terminal 100 of the service user may perform app authentication using the link address contained in the QR image, and may select a Verifiable Credential (VC) at step S204.

That is, at step S204, after it accesses the verifiable credential (VC) stored in the app through authentication set in the app, the first terminal 100 of the service user may select the verifiable credential, which is identity information or contains identity information (a resident registration card, a driving license, a student's identification card, a digital signature, a trusted certificate, or the like) issued in advance by an external issuing organization, or may automatically select identity information registered in advance.

The selected identity information may include birth date information.

The first terminal 100 of the service user may generate a Verifiable Presentation (VP) from the selected VC at step S205.

The first terminal 100 of the service user submits the generated VP to the identity information verification apparatus 10 through a VP submission link address, thereby transmitting a request for identity information verification at step S206.

That is, at step S206, the request for identity information verification may be transmitted to the identity information verification apparatus 10 along with the information contained in the QR image.

Here, at step S206, the first terminal 100 of the service user may generate a Verifiable Presentation (VP), which is a format for submission of a verifiable credential (VC), and submit the VP to the identity information verification apparatus 10.

Here, at step S206, a VP may be generated from the VC, which is first identity information that the first terminal 100 of the service user has previously received from an external issuing organization, and may then be submitted along with the request for identity information verification.

The identity information verification apparatus 10 may receive the request for identity information verification, which is submitted through the link information contained in the QR image scanned by the first terminal 100 of the service user, at step S207.

Here, at step S207, information required for verification may be acquired from the identity information included in the verification request.

Here, at step S207, the identifier information DID of the submitter is acquired from the VP, and the locations at which the identifier information DID of the issuing organization and information about the validity state of the VC are posted in the blockchain 20 may be acquired from the VC included in the VP.

The identity information verification apparatus 10 may request public key and the information about the validity state of the VC from the blockchain 20 at step S208 using the information acquired at step S207.

Here, at step S208, the DID of the submitter of the VP, which is required for acquiring the DID document of the submitter of the VP, the DID of the VC issuing organization, which is required for acquiring the DID document of the VC issuing organization, and a URI value indicating the location at which the information about the validity state of the VC is posted, which is required for retrieving the information about the validity state of the VC, may be submitted to the blockchain 20.

The blockchain 20 may analyze the requested information received from the identity information verification apparatus 10, retrieve the DID document and the information about the validity state of the VC from the blockchain, and transmit the retrieved information to the identity information verification apparatus 10 at step S209.

Here, at step S209, the DID document of the submitter of the VP is acquired using the DID of the submitter of the VP, which is included in the request information received from the identity information verification apparatus 10, the DID document of the VC issuing organization is acquired using the DID of the issuing organization, the VC state information is acquired using the URI value indicating the location at which the VC state information is posted, and the acquired results may be transmitted to the identity information verification apparatus 10.

In response to the request for identity information verification, made by scanning the QR image, the identity information verification apparatus 10 checks the identity information registered by the service user, the public key for identity information verification and the state information pertaining to the identity information, which are posted in the blockchain 20, and the identity information included in the request for identity information verification, thereby verifying the identity information at step S210.

Here, at step S210, authentication of the first terminal 100 of the service user, which accesses the identity information verification apparatus 10 through the link for requesting identity information verification, may be processed using second identity information of the service user, which is registered in advance in the identity information verification apparatus 10 by the first terminal 100 of the service user, and then the identity requirement information of the service provider and the first identity information may be received.

Here, at step S210, authentication of the first terminal 100 of the service user, which makes access through the link for requesting identity information verification, is processed using the second identity information registered in advance, and the identity requirement information of the service provider and the first identity information may be received.

Here, at step S210, whether the issuer of the first identity information is identical to the entity that registered the second identity information is checked, whereby the first identity information may be verified.

Here, at step S210, the VP generated from the VC, which is the first identity information that the first terminal 100 of the service user has received in advance from an external issuing organization, may be received.

Here, at step S210, a digital signature is verified using the DID document of the submitter of the VP, which is retrieved from the blockchain 20 using the VP, and whether the public key of the submitter of the VP is the same as the public key of the second identity information registered in advance may be verified.

Here, at step S210, a digital signature is verified using the DID document of the VC issuing organization, which is retrieved from the blockchain 20 using the VC included in the VP, whereby whether the identity information has been tampered with may be checked.

Here, at step S210, whether the DID of the owner of the VC (the service user) is the same as the DID of the submitter of the VP may be verified.

Here, at step S210, the VC state information, which is retrieved from the blockchain, is checked, whereby whether the VC is a valid VC at that time (the validity period and whether it is discarded) may be checked.

When the identity information verification succeeds, the identity information verification apparatus 10 may generate an identity information verification result at step S211.

Here, at step S211, when the first identity information satisfies the identity requirement information of the service provider, the identity information verification result may be generated.

For example, at step S211, when the identity requirement information of the service provider specifies adult verification and when the service user corresponding to the first identity information is an adult, an identity information verification result may be generated.

The identity information verification result may be generated as data having various forms.

For example, the identity information verification result may be a confirmation number configured with a combination of digits, a code configured with a combination of digits and letters, a random image, a voice message, a video message, or data encrypted based on a public key and a private key.

Here, at step S211, an encrypted verification result may be generated using the public keys, which are received in advance from the service provider and the service user at registration time.

The identity information verification result may be transmitted to the first terminal 100 of the service user and the second terminal 200 of the service provider at steps S212 and S213.

That is, at steps S212 and S213, the result of verification of the identity information of the first terminal 100 may be transmitted to the first terminal 100 of the service user and the second terminal 200 of the service provider.

Here, at step S212, the identity information verification result may be transmitted to the second terminal 200 of the service provider.

For example, at step S212, the identity information verification result may be transmitted to the second terminal 200 of the service provider in SMS form. This may be applied regardless of the ID wallet type of the service user.

Here, at step S212, when an ID wallet app is supported, a verification result confirmation number may be returned in response to the VP submitted by the app.

Here, at step S212, communication connection between the second terminal 200 of the service provider and the identity information verification apparatus 10 may be maintained until the app receives a confirmation number subsequent to submitting the VP.

Here, at step S212, when an ID wallet app is supported, the identity information verification result may be transmitted in the form of an app push notification.

Also, at step S213, the identity information verification result may be transmitted to the first terminal 100 of the service user.

For example, at step S213, the identity information verification result may be transmitted to the first terminal 100 of the service user in SMS form. This may be applied regardless of the ID wallet type of the service user.

Here, at step S213, when an ID wallet app is supported, a verification result confirmation number may be returned in response to the VP submitted by the app.

Here, at step S213, communication connection between the first terminal 100 of the service user and the identity information verification apparatus 10 may be maintained until the app receives a confirmation number subsequent to submitting the VP.

Here, at step S213, when an ID wallet app is supported, the identity information verification result may be transmitted in the form of an app push notification.

The service provider confirms that the identity information verification result is received at the second terminal 200 of the service provider, and may request the service user to show the verification result at step S214.

The service user may show the verification result at step S215 in response to the request by the service provider to show the verification result.

The service provider may check the verification result presented by the service user at step S216.

Here, at step S216, the service user and the service provider output and compare the identity information verification result received by the first terminal 100 of the service user and that received by the second terminal 200 of the service provider, and when it is confirmed that the same information is output, the service provider may permit the service user to use the service.

Here, at step S216, when identity information verification succeeds, a confirmation number may be generated using a random combination of 4 to 6 digits so as to be easily recognizable by humans and transmitted to the first terminal 100 of the service user and the second terminal 200 of the service provider in the form of a push notification appearing in an app, SMS, or the like.

Here, at step S216, the service provider may request a confirmation number from the service user after checking the confirmation number "1234" received in the second terminal 200 of the service provider, and the service user may show the confirmation number "1234" output in the first terminal 100 of the service user and receive confirmation that the same confirmation number is output, thereby receiving confirmation that the identity information is verified and receiving approval to use the service from the service provider.

Here, at step S216, upon receiving the identity information verification result, the first terminal 100 of the service user and the second terminal 200 of the service provider transmit and receive the identity information verification result therebetween through nearfield communication, and when the identity information verification results are the same as each other, it may be automatically confirmed that the identity verification result is "success."

Here, at step S216, when the verification result encrypted with the public key of the service user is transmitted to the first terminal 100 of the service user, the first terminal 100 of the service user decrypts the encrypted verification result using the private key of the service user, and when the verification result encrypted with the public key of the service provider is transmitted to the second terminal 200 of the service provider, the second terminal 200 of the service provider decrypts the encrypted verification result using the private key of the service provider, whereby the first terminal 100 of the service user and the second terminal 200 of the service provider may acquire the decrypted verification result.

Here, at step S216, the service user and the service provider may check the verification result by displaying the decrypted verification result in the first terminal 100 of the service user and the second terminal 200 of the service provider, as described above, or the first terminal 100 of the service user and the second terminal 200 of the service provider may automatically check and output the verification result through nearfield communication therebetween.

The service provider may permit the service user corresponding to the first terminal 100 of the service user to use the service at step S217 based on the result of comparison of the identity information verification result confirmed by the service provider with the identity information verification result received by the first terminal 100 of the service user.

The service user may use the service by receiving approval to use the service from the service provider at step S218.

For example, the service user is able to purchase products, the sale of which is limited to adult customers, such as cigarettes, alcohol, or the like, because the fact that the service user is an adult is confirmed by the service provider.

Figure 5:
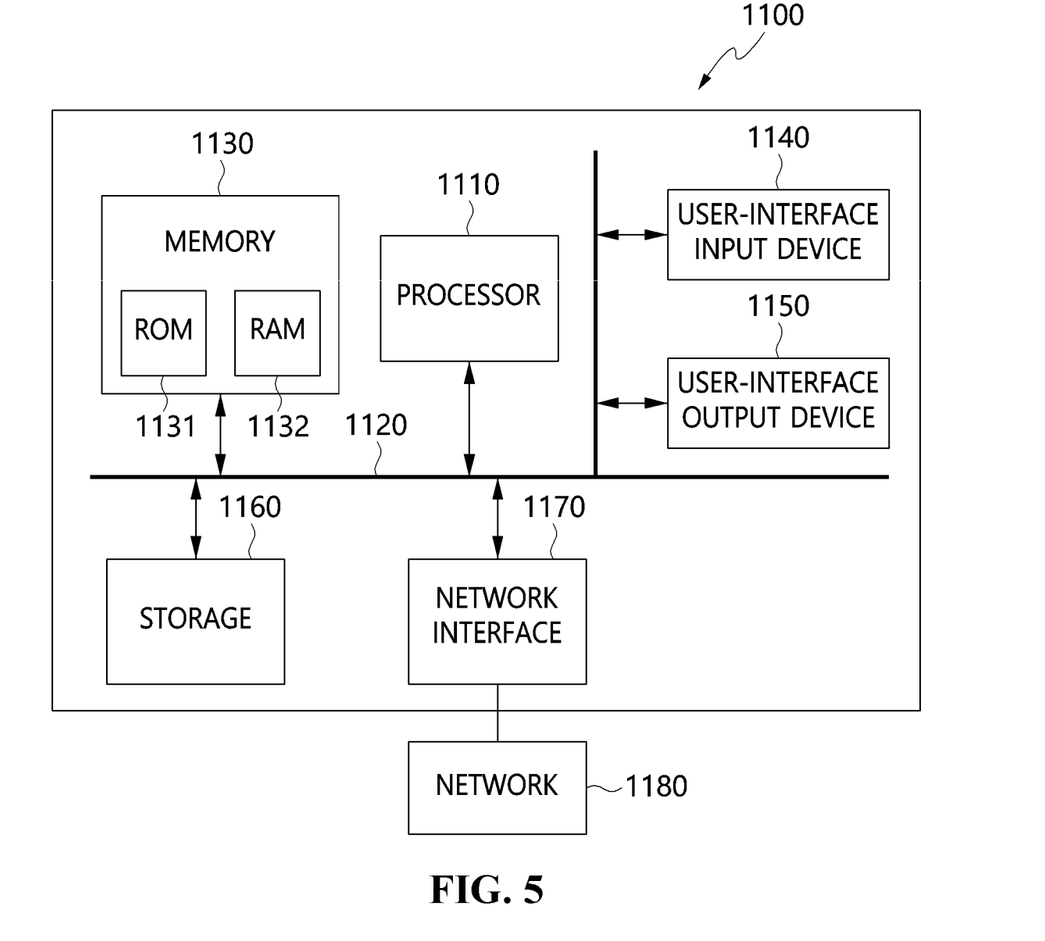
FIG. 5 is a view illustrating a computer system according to an embodiment of the present disclosure.

FIG. 5 is a view illustrating a computer system according to an embodiment of the present disclosure.

Referring to FIG. 5, nodes in the blockchain 20, the identity information verification apparatus 10, the first terminal 100 of a service user, and the second terminal 200 of a service provider according to an embodiment of this disclosure may be implemented in a computer system 1100 such as a computer-readable recording medium. As illustrated in FIG. 5, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The identity information verification apparatus 10 according to an embodiment of the present disclosure includes one or more processors 1110 and executable memory 1130 for storing at least one program executed by the one or more processors 1110, and the at least one program receives a request for identity information verification, required for receiving approval to use a service provided by a service provider, from a first terminal of a service user, verifies identity information of the first terminal using first identity information of the first terminal of a service user, received according to the request for identity information verification, and second identity information registered in advance by the first terminal of a service user, and transmits the result of verification of the identity information of the first terminal of a service user to the first terminal of a service user and a second terminal of the service provider.

Here, the first terminal of a service user may select the first identity information, issued in advance by an external issuing organization, by scanning a QR image provided by the service provider.

Here, the at least one program may verify the identity information of the first terminal of a service user using the identifier information of the service user, the identifier information of the issuing organization that issued the first identity information, and information about the validity state of the first identity information, which are posted in advance in a blockchain 20.

Here, the at least one program performs a comparison to check whether the owner of the first identity information is identical to the entity that registered the second identity information, verifies the digital signature of the issuing organization, with which the first identity information is signed, checks whether the submitter of the first identity information is identical to the owner of the first identity information, and checks the information about the validity state of the first identity information in the blockchain 20, thereby verifying the first identity information.

Here, the QR image may contain identity requirement information of the service provider and a link for requesting identity information verification.

Here, the at least one program may process authentication of the first terminal of a service user, which makes access thereto through the link for requesting identity information verification, using the second identity information and receive the identity requirement information of the service provider and the first identity information.

Here, when the first identity information satisfies the identity requirement information of the service provider, the at least one program may generate an identity information verification result.

Here, the second terminal of a service provider may permit the service user corresponding to the first terminal of a service user to use the service based on the result of a comparison of the identity information verification result received thereby with the identity information verification result received by the first terminal of a service user.

As described above, the apparatus and method for verifying identity information according to an embodiment of the present disclosure are not limitedly applied to the configurations and operations of the above-described embodiments, but all or some of the embodiments may be selectively combined and configured, so the embodiments may be modified in various ways.

INDUSTRIAL APPLICABILITY

According to the apparatus and method for verifying identity information described in this disclosure, identity information of a service user may be verified without the service user exposing the identity information to a service provider, and small service providers, such as small- and medium-sized bricks-and-mortar stores, may verify identity information of service users without additional devices. Therefore, the disclosed apparatus and method are industrially applicable.

The invention claimed is:

1. A method for verifying identity information, which is performed by an identity information verification apparatus, comprising:
receiving, by the identity information verification apparatus, a request for identity information verification, which is required for receiving approval to use a service provided by a service provider, from a first terminal of a service user, the first terminal sending the request for identity information verification;
verifying identity information of the first terminal using first identity information of the first terminal, which is received according to the request for identity information verification, and second identity information registered in advance in the identity information verification apparatus by the first terminal; and
transmitting a result of verification of the identity information of the first terminal to the first terminal and a second terminal of the service provider,
wherein receiving the request for identity information verification comprises scanning, by the first terminal, a Quick Response (QR) image provided by the service provider and thereby selecting the first identity information issued in advance by an external issuing organization,
wherein the QR image contains identity requirement information of the service provider and a link for requesting identity information verification,
wherein receiving the request for identity information verification comprises processing authentication of the first terminal, which makes access through the link for requesting identity information verification, using the second identity information and receiving the identity requirement information of the service provider and the first identity information,
wherein verifying the identity information comprises generating the result of verification of the identity information when the first identity information satisfies the identity requirement information of the service provider.

2. The method of claim 1, wherein transmitting the result of verification of the identity information comprises permitting, by the second terminal, the service user corresponding to the first terminal to use the service based on a result of comparison of the identity information verification result received by the second terminal with the identity information verification result received by the first terminal.

3. An apparatus for verifying identity information, comprising:
one or more processors; and
non-transitory computer-readable memory for storing at least one program executed by the one or more processors,
wherein the at least one program
receives a request for identity information verification, which is required for receiving approval to use a service provided by a service provider, from a first terminal of a service user, the first terminal sending the request for identity information verification,
verifies identity information of the first terminal using first identity information of the first terminal, which is received according to the request for identity information verification, and second identity information registered in advance by the first terminal, and
transmits a result of verification of the identity information of the first terminal to the first terminal and a second terminal of the service provider,
wherein the first terminal scans a Quick Response (QR) image provided by the service provider, thereby selecting the first identity information issued in advance by an external issuing organization,
wherein the QR image contains identity requirement information of the service provider and a link for requesting identity information verification,
wherein the at least one program processes authentication of the first terminal, which makes access thereto through the link for requesting identity information verification, using the second identity information and receives the identity requirement information of the service provider and the first identity information,
wherein the at least one program generates the result of verification of the identity information when the first identity information satisfies the identity requirement information of the service provider.

4. The apparatus of claim 3, wherein the second terminal permits the service user corresponding to the first terminal to use the service based on a result of comparison of the identity information verification result received thereby with the identity information verification result received by the first terminal.

* * * * *